United States Patent
Amthor et al.

(10) Patent No.: US 12,437,027 B2
(45) Date of Patent: Oct. 7, 2025

(54) MICROSCOPY SYSTEM AND METHOD FOR GENERATING TRAINING DATA

(71) Applicant: Carl Zeiss Microscopy GmbH, Jena (DE)

(72) Inventors: Manuel Amthor, Jena (DE); Daniel Haase, Zöllnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 1000 days.

(21) Appl. No.: 17/493,915

(22) Filed: Oct. 5, 2021

(65) Prior Publication Data

US 2022/0114387 A1 Apr. 14, 2022

(30) Foreign Application Priority Data

Oct. 9, 2020 (DE) ...................... 10 2020 126 610.3

(51) Int. Cl.
*G06F 18/214* (2023.01)
*G02B 21/36* (2006.01)
(Continued)

(52) U.S. Cl.
CPC ......... *G06F 18/214* (2023.01); *G02B 21/365* (2013.01); *G06F 18/2431* (2023.01); *G06F 18/285* (2023.01); *G06N 20/00* (2019.01); *G06T 7/11* (2017.01); *G06V 10/44* (2022.01); *G06V 10/7515* (2022.01); *G06V 10/95* (2022.01);
(Continued)

(58) Field of Classification Search
CPC .. G06F 18/214; G06F 18/2431; G06F 18/285; G02B 21/365; G02B 21/34; G02B 21/26; G06N 20/00; G06T 7/11; G06T 2207/10056; G06T 2207/20081; G06T 2207/20084; G06V 10/44; G06V 10/7515; G06V 10/95; G06V 10/26; G06V 10/454;
(Continued)

(56) References Cited

U.S. PATENT DOCUMENTS 5,294,989 A 3/1994 Moore et al.
5,828,776 A 10/1998 Lee et al.
(Continued)

FOREIGN PATENT DOCUMENTS

CN 108875732 A 11/2018
DE 102017109698 A1 11/2018
(Continued)

OTHER PUBLICATIONS

Ginzberg, et al., "On being the right (cell) size," May 15, 2015, 19 pages.
(Continued)

*Primary Examiner* — Wesley J Tucker
(74) *Attorney, Agent, or Firm* — LaBatt, LLC

(57) ABSTRACT

A microscopy system for generating training data for a machine learning model comprises a microscope configured to capture an image. The microscopy system further comprises a computing device configured to generate a segmentation mask based on the image, adjust a pattern described by a parameterized model to the segmentation mask, generate an updated segmentation mask using the adjusted pattern, and incorporate the updated segmentation mask or an image derived from the same in the training data.

20 Claims, 5 Drawing Sheets

(51) Int. Cl.
| | |
|---|---|
| *G06F 18/20* | (2023.01) |
| *G06F 18/2431* | (2023.01) |
| *G06N 20/00* | (2019.01) |
| *G06T 7/11* | (2017.01) |
| *G06V 10/44* | (2022.01) |
| *G06V 10/75* | (2022.01) |
| *G06V 10/94* | (2022.01) |

(52) U.S. Cl.
CPC .............. *G06T 2207/10056* (2013.01); *G06T 2207/20081* (2013.01); *G06T 2207/20084* (2013.01)

(58) Field of Classification Search
CPC .... G06V 10/778; G06V 10/82; G06V 10/993; G06V 20/695
See application file for complete search history.

(56) References Cited

U.S. PATENT DOCUMENTS

| | | | |
|---|---|---|---|
| 5,978,497 | A | 11/1999 | Lee et al. |
| 10,885,631 | B2 | 1/2021 | Jackson et al. |
| 11,301,748 | B2* | 4/2022 | Sha ................... G06T 7/0004 |
| 11,307,398 | B2 | 4/2022 | Haase et al. |
| 11,379,970 | B2 | 7/2022 | Koopman et al. |
| 11,620,507 | B2* | 4/2023 | Otterstedt ............ G06V 10/143 706/25 |
| 11,754,392 | B2 | 9/2023 | Amthor et al. |
| 11,861,497 | B2* | 1/2024 | Levinshtein ............. G06N 3/08 |
| 2008/0044084 | A1 | 2/2008 | Lee et al. |
| 2009/0196487 | A1 | 8/2009 | Yishai et al. |
| 2020/0057291 | A1 | 2/2020 | Haase et al. |
| 2020/0088984 | A1 | 3/2020 | Haase et al. |
| 2020/0200531 | A1 | 6/2020 | Amthor et al. |
| 2020/0371333 | A1 | 11/2020 | Amthor et al. |
| 2020/0380362 | A1* | 12/2020 | Cao ...................... G06N 3/04 |
| 2021/0064845 | A1 | 3/2021 | Stumpe et al. |
| 2021/0080838 | A1 | 3/2021 | Tel et al. |
| 2021/0264589 | A1* | 8/2021 | Jacob ..................... G06T 7/194 |
| 2021/0374936 | A1* | 12/2021 | Koopman .............. G06N 3/084 |
| 2022/0114387 | A1 | 4/2022 | Amthor et al. |
| 2022/0114732 | A1* | 4/2022 | Amthor ................. G02B 21/26 |
| 2022/0392062 | A1* | 12/2022 | Chavez Badiola .... G06V 10/26 |
| 2023/0051895 | A1* | 2/2023 | Winfree ................. B29C 70/54 |
| 2023/0135351 | A1* | 5/2023 | Ravishankar ........... G06T 11/00 345/633 |
| 2023/0221239 | A1* | 7/2023 | Praljak ................. G06V 20/698 382/134 |
| 2023/0259587 | A1* | 8/2023 | Lin ............................ G06T 5/60 |
| 2023/0281809 | A1* | 9/2023 | Song ...................... G06N 3/084 382/131 |
| 2024/0169541 | A1* | 5/2024 | Zhang ....................... G06T 7/11 |
| 2024/0282087 | A1* | 8/2024 | Freytag ................. G06V 10/993 |
| 2025/0148813 | A1* | 5/2025 | Pan ........................ G06V 10/44 |

FOREIGN PATENT DOCUMENTS

| | | |
|---|---|---|
| DE | 102017111718 A1 | 12/2018 |
| DE | 102018133188 A1 | 6/2020 |
| DE | 102019114012 A1 | 11/2020 |
| WO | 2019160580 A1 | 8/2019 |

OTHER PUBLICATIONS

Office action for U.S. Appl. No. 17/493,937, Dec. 6, 2023, 13 pages.
Office action for U.S. Appl. No. 17/493,937, Jun. 18, 2024, 19 pages.
He, K., et al, "Mask R-CNN", arXiv:1703.06870v3 [cs.CV] Jan. 24, 2018, https://arxiv.org/pdf/1703.06870, 12 pages.
"Lymphe," Wikipedia, last edited on Sep. 28, 2020, accessed on May 5, 2021, https://de.wikipedia.org/w/index.php?title=Lymphe&oldid=204061667, 10 pages, (English translation provided).
Dr. Nabers, DE Application No. 102020126610.3, Search Report, May 17, 2021, 9 pages (No English translation available).
Dr. Nabers, DE Application 102020126602.2, Search Report, May 17, 2021, 9 pages (No English translation available).
Final office action for U.S. Appl. No. 17/493,937, dated Oct. 25, 2024, 25 pages.
Final office action for U.S. Appl. No. 17/493,937, Jul. 8, 2025, 24 pages.
Srinivasa, G., et al., "Active Mask Segmentation of Fluorescence Miscroscope Images," IEEE Transactions on Image Processing, Aug. 2009, 13 pages, vol. 18, No. 8, IEEE Xplore.
Office action for U.S. Appl. No. 17/493,937, Mar. 25, 2025, 19 pages.
Office action for Chinese Patent Application No. 202111129861.6, Jul. 30, 2025, 17 pages (with English Translation).

* cited by examiner

MICROSCOPY SYSTEM AND METHOD FOR GENERATING TRAINING DATA

REFERENCE TO RELATED APPLICATIONS

The current application claims the benefit of German Patent Application No. 10 2020 126 610.3, filed on 9 Oct. 2020, which is hereby incorporated by reference. Aspects of the current application are related to German Patent Application No. 10 2020 126 602.2, filed on 9 Oct. 2020 and the corresponding U.S. patent application Ser. No. 17/493,937, filed on 5 Oct. 2021, each of which is hereby incorporated by reference.

FIELD OF THE DISCLOSURE

The present disclosure relates to a microscopy system and a method for generating training data for a machine learning model. The machine learning model can in particular be a segmentation model that learns by means of the training data to segment certain objects in microscope images, e.g., to distinguish sample receptacles from other image content in an image.

BACKGROUND OF THE DISCLOSURE

Automation and user comfort are playing an increasingly important role in modern microscopy systems and other measuring devices. A microscopy system is expected, for example, to detect, navigate and analyze a sample in a largely automated manner. To this end, one or more overview images of a sample environment are generally captured. Objects can be detected in an automated manner from the overview images, in particular sample areas or sample carriers and their sample receptacles, e.g., wells of a microtiter plate. A navigation map can be created from the analyzed overview image based on which a motorized sample stage can navigate and position a sample receptacle of interest in an automated manner using calibration data. Height information pertaining to the sample carrier or the sample can also be obtained from the overview image, which enables an automatic coarse focus. Height information can also be used for collision prevention through the definition of allowed areas of movement for motorized microscope components based on the detected sample or detected sample carrier.

The use of machine learning models for these illustrative applications is increasing. A model is learned by a learning algorithm using training data (machine learning model in the following). Compared to classically programmed algorithms, machine learning models often provide significant advantages, in particular in terms of applicability to a wide range of different images captured under different illumination conditions and potentially showing numerous different structures. In order to learn a robust, generalizable model, the scope and quality of the training data play an important role. If an overview image captured during a measurement operation deviates too much from a distribution of the training data, there is a risk that the machine learning model will produce an erroneous result. In order to reduce this risk, it is possible to add further training data that reflects novel measurement situations, e.g., training data showing novel sample carriers or captured in novel illumination conditions.

The exploitation of machine learning models for the assessment of microscope images has been described by the Applicant, for example, in DE 10 2018 133 188 A1, DE 10 2017 109 698 A1 and DE 10 2017 111 718 A1, in which in particular a sample carrier or a sample area is localized in a captured overview image, e.g., by segmentation.

A generic microscopy system for generating training data for a machine learning model comprises a microscope configured to capture an image. The microscopy system further comprises a computing device configured to generate a segmentation mask based on the image. In this connection, the user is conventionally provided with, for example, an input tool for drawing manually in the segmentation mask.

In a generic method for generating training data for a machine learning model, at least one image and an associated segmentation mask are acquired.

Reference is made to FIG. 1 in the following for a quick illustration of a training of a machine learning model. FIG. 1 schematically illustrates steps of a typical training of a machine learning model. The steps represent a typical training process and can constitute an integral part of variants of the invention. Training data T comprising a plurality of images 11 (also called input images in the following) and associated target images 22 is provided. FIG. 1 illustratively shows an image 11 and an associated target image 22. The image 11 is an overview image or a section of an overview image, as can be captured by an overview camera of a microscope. The image 11 shows at least a part of a sample carrier 7 with a plurality of sample receptacles 6. In this example, the sample carrier 7 is a microtiter plate whose sample receptacles 6 are composed of wells/vessels. A segmentation mask 21 is provided as the associated target image 22. Objects to be segmented, i.e. their boundaries, are portrayed in the segmentation mask 21. In the present example, the segmentation mask 21 is a binary mask in which one pixel value labels corresponding pixels as belonging to a sample receptacle and another pixel value indicates that corresponding pixels do not belong to a sample receptacle (background). The segmentation mask thus comprises a plurality of image areas 26 of sample receptacles, while the remaining image area 27 indicates a background, which in this case is formed by sample carrier areas outside the sample receptacles. The image areas 26 of the sample receptacles should correspond precisely with the sample receptacles 6 of the image 11 in terms of their shape, size and position so that a model can be learned that works with precision.

The images 11 are entered into a model S' (machine learning model), which can comprise a deep neural network, e.g., a CNN (convolutional neural network). The model S' comprises a plurality of model parameters M1-M9 to be defined using the training data T. The model parameters M1-M9 can be, e.g., entries of convolution matrices of the CNN. The model S' first calculates an output image 31 from each input image 11 with starting values of the model parameters M1-M9. The output images 31 and the associated target images 22 are entered into a loss function L, which calculates a deviation between the same. A predefined optimization function O minimizes the loss function L by iteratively adjusting the values of the model parameters M1-M9. The iterative adjustment can occur, e.g., via gradient descent and backpropagation. After the training has been completed and the loss function L is minimized, output images 31 correspond closely with the target images 22. The model S' has thus learned to calculate output images 31 that have a high degree of correspondence with the target images 22 from input images 11. Based on the target images chosen, model S' is a segmentation model in the illustrated example.

As explained in the foregoing, the segmentation model is expected to be able to segment unseen images, i.e. images not included in the training data, with a good quality if they lie within a statistical distribution of the training data. Otherwise, the training data should be supplemented so that a new model to be trained is capable of delivering high-quality results in new situations.

Providing precise target data can be a labor-intensive process. Target data is often created manually by a user. Any imprecise entries, for example a segmentation mask that a user has sketched imprecisely as a target image, lead to a generally poorer quality of the learned model S. This problem is exacerbated by the fact that new training data is regularly added in order to adapt the model to new situations.

SUMMARY OF THE DISCLOSURE

It can be considered an object of the invention to provide a microscopy system and a method capable of providing high-quality training data for a machine learning model in a manner that is as simple as possible.

This object is achieved by means of the microscopy system with the features of claim 1 and by means of the method with the features of claim 2.

According to the invention, in the microscopy system of the aforementioned type, the computing device is configured to adjust a pattern described by a parameterized model to the segmentation mask. Using the adjusted pattern, the computing device generates an updated segmentation mask. The updated segmentation mask or an image derived from the same is incorporated in the training data.

According to the invention, also in the method of the aforementioned type, a pattern described by a parameterized model is adjusted to the segmentation mask. An updated segmentation mask is created using the adjusted pattern. The updated segmentation mask or an image derived from the same is incorporated in the training data.

Knowledge of geometric properties of image content of the image can be exploited via the parameterized model for describing a pattern. This pattern can predefine particular shapes or geometric content which can be adjusted by variable parameters. For example, the pattern can comprise circular shapes in a regular arrangement, wherein the size and spacing of the latter are adjustable by means of the parameters. Such a pattern can represent with precision a segmentation mask of an (overview) image of a microtiter plate comprising circular sample receptacles/wells in a regular arrangement. It is thereby possible to generate training data representing or based on a particularly precise segmentation.

Optional Embodiments

Advantageous variants of the microscopy system according to the invention and of the method according to the invention are the object of the dependent claims and are explained in the following.
Training Data of the Machine Learning Model The calculated updated segmentation mask can form part of training data of a machine learning model. In particular, the image can be an input image of the training data and the updated segmentation mask can be used as an associated predefined target image of the training data. The machine learning model can thus be a segmentation model.

Alternatively, it is possible to use an image derived from the updated segmentation mask as a target image of the training data. For example, object bounding boxes, in particular rectangles around the segmented objects, can be calculated from the updated segmentation mask and be used as target data of the training data. A machine learning model learned from this training data can constitute a detection model that outputs bounding boxes of particular objects localized in an input image for that input image.

Optional variants of the invention also comprise conducting a training of the machine learning model in which the at least one image is an input image of the training data and the updated segmentation mask or image derived from the same is used as a predefined target image of the training data.
Generating the Segmentation Mask; Learned Segmentation Model The segmentation mask for the image can be created by a user or a segmentation program. In both of these cases, the user's input or the results of the segmentation program are rendered more precise by means of the pattern adjustment.

Notable advantages can result, however, when the segmentation mask is calculated by a learned segmentation model. In this case, it is possible to exploit the updated segmentation mask incorporated in the training data for a new training of the segmentation model. It is thereby possible to improve a segmentation model learned using previous training data by adding more precise training data or replacing previous training data with the updated segmentation mask. This allows existing training data (which comprises input images and associated predefined target images/segmentation masks) to be improved through the replacement of the previous target image of the training data with the updated segmentation mask. In addition to the advantages of the segmentation model in improving an image that already forms part of the input images of the training data, it further allows new training data to be added, for example when an image of a novel sample carrier model is captured. As this sample carrier model was not covered by the scope of the previous training data, the corresponding segmentation model can create an imprecise segmentation mask from which, however, the more precise updated segmentation mask is created via the pattern adjustment. This can occur without any intervention on the part of a user. It is thus possible to automatically provide a precise target image (namely the updated segmentation mask) for a captured image that is to become part of the training data without the need for a labour-intensive manual and potentially imprecise intervention on the part of a user.

In other words, the machine learning model trained with the updated segmentation mask can be a segmentation model. The segmentation mask can be calculated based on the image using a previous version of this segmentation model, which was learned using training data that did not comprise the updated segmentation mask.

The image can be input directly into the segmentation model in order to calculate the segmentation mask. Alternatively, a processing image derived from the image can be entered into the segmentation model. For example, a section of the image can be determined and used as the processing image, or an image-to-image mapping, e.g. a noise reduction or a resolution enhancement, can be calculated first.

In related variants of the invention, the segmentation mask is calculated based on the image by means of a segmentation model learned using a first set of training data. The machine learning model trained with the updated segmentation mask is an updated segmentation model whose training data comprises at least part of the first set of training data and the updated segmentation mask.

The updated segmentation model can replace the segmentation model and the processes can then be repeated, i.e. the segmentation model generates an updated segmentation mask with which a training is carried out, based on which a new, freshly updated segmentation model is learned. A freshly trained, updated segmentation model is thus used in each pass, which calculates a more precise segmentation mask; each updated segmentation mask determined by the pattern adjustment thus also becomes more precise, which results in improved target images in the training data. This cycle can be repeated a number of times. In these iterations, the image remains an input image of the training data that is not subjected to modification while the updated segmentation mask incorporated in the training data as a target image is recalculated at each pass of the cycle and modified accordingly.

Parameterized Model for Describing the Pattern

The parameterized model specifies a framework model which defines an appearance by means of values of parameters that are to be determined. The cited pattern constitutes the appearance in the present disclosure.

The pattern can in particular be a regular pattern and/or comprise repeating shapes. A shape or an object can in particular be a delineated (closed) shape, for example a circle, an oval, a rectangle, a square or a distorted/elongated representation of these objects. The pattern can thus exhibit periodicity.

In particular, the regular pattern can comprise or be an arrangement of shapes in the form of a grid. The shapes can be similar shapes or similarly shaped objects (e.g. circles) and can thus correspond to the sample receptacles of a sample carrier. A grid arrangement is to be understood as denoting a uniform spacing between objects in one direction or two directions in the two-dimensional pattern. Not all objects of the pattern have to have the same shape in the grid arrangement, however. For example, a grid arrangement can be used to describe a microarray or microarray slide. In a microarray slide, samples, for example tissue samples, can be arranged with a predefined spacing in the form of a grid, e.g., by means of paraffin embedding. The individual tissue samples do not have to have the same shape or can appear to have different shapes due to, e.g., an uneven staining.

The regular pattern can in particular describe a sample carrier. The shapes of the pattern in this case correspond to the sample areas of the sample carrier or, if applicable, to sample receptacles of the sample carrier. The sample carrier can be, for example, a microtiter plate with (circular) wells or a chamber slide with (rectangular or square) chambers as sample receptacles. The sample carrier can also comprise a Petri dish with a compartmentalization, for example a star-shaped division into two, three or more chambers. The sample carrier can also be a transparent slide on which a plurality of samples are arranged spaced apart from one another. The pattern can also be used to describe a matrix arrangement of samples, e.g., material samples. The term "sample" is intended to be understood here in a general sense and can in particular comprise biological samples, rock samples, semiconductor products or electronic components.

The parameters of the parameterized model by means of which the pattern is defined are calculated so that the pattern has a highest possible degree of correspondence with the segmentation mask. A degree of correspondence can be understood in terms of overlapping surface areas when the pattern is superimposed on the segmentation mask. That is to say that an imaged representation of the pattern can be generated with the same number of pixels (image resolution) as the segmentation mask and this representation of the pattern is superimposed on or compared with the segmentation mask. The Jaccard similarity coefficient—also known as the Jaccard index and expressed as the ratio of Intersection over Union—can be calculated as the quality measure for the correspondence.

Parameters of the Parameterized Model

The parameters of the parameterized model can in particular indicate or be indicative of one or more of the following characteristics:

Sizes of shapes of the pattern. In particular, a parameter can indicate a uniform size of a plurality of or all shapes, which is practical, e.g., for describing sample receptacles of a microtiter plate or a chamber slide. A plurality of parameters can generally describe the sizes of the shapes, wherein the number of parameters employed for describing size is smaller than the number of shapes.

Spacing between shapes of the pattern. A parameter can in particular describe a uniform spacing between a plurality or all shapes of the pattern, as is generally fitting for microtiter plates or chamber slides. It is also possible to use separate parameters to indicate a uniform spacing for each spatial direction (e.g., in the horizontal and vertical directions), whereby a spacing between rows of shapes can differ from a spacing between columns of shapes.

Slope of the pattern. A parameter can describe a slope of the pattern relative to a straight reference line, i.e. an angle of rotation of the pattern. The slope can indicate, e.g., an orientation of rows or columns of shapes of the pattern relative to an image boundary of the segmentation mask.

Position of the pattern relative to the segmentation mask. The position of the pattern can be described by one translation parameter or two translation parameters for two directions.

Start and end positions of the pattern. Depending on the field of view of an image/overview image or the scene in view, it is possible that the content of the image or segmentation mask is not constituted entirely by objects to be described by the pattern. For example, an image can show a chamber slide in its entirety so that the sample receptacles do not extend over the entire image nor—as a result—over the entire segmentation mask in the horizontal and vertical directions. In such cases, it can be expedient for additional parameters to describe start and end positions of the pattern or a total number of shapes. For example, a parameter can indicate the number of shapes per row and another parameter can indicate the number of shapes per column. Alternatively, this issue can be avoided by cropping the segmentation mask first so that the depicted objects extend over the entire width or height of the image.

Class type of the shapes of the pattern. Class types should be understood as different geometric shapes, e.g., a circle as opposed to a rectangle or square. A parameter for indicating the class type thus does not assume a value on a number continuum, in contrast to, e.g., the parameter for indicating spacing. By adjusting the parameter pertaining to class type, it is in particular possible to describe and correct segmentation masks of sample carriers with circular sample receptacles as well as segmentation masks of sample carriers with square sample receptacles without knowing the shape of the sample receptacles in advance. For example, a readily implementable calculation method can provide that an iterative adjustment of the parameterized model is calculated for each allowed parameter value pertaining to the class type, wherein the parameter value pertaining to the class type initially remains unaffected by the respective iterative adjustments. It can subsequently be evaluated for which class type the best adjustment was achieved, i.e. the greatest correspondence with the segmentation mask.

The parametric model can in particular exploit the fact that a plurality of shapes have identical properties and/or are located in a regular arrangement. Defective areas in the segmentation mask—e.g., missing objects or a shape deviating from the shape of the other objects—can not only be detected thereby, but above all corrected.

Iterative Adjustment or Analytical Calculation of the Parameters

Adjusting the pattern to the segmentation mask can be understood as an iterative adjustment of the parameters by means of which the pattern is described or as an analytical calculation (without iterative modifications of the parameters).

If the parameters are calculated by means of an iterative adjustment, the iteration target can be to maximize the correspondence between the pattern and the segmentation mask. For example, the Jaccard similarity coefficient can be maximized. Alternatively, a deviation between the pattern and the segmentation mask can be minimized via the iteration steps.

An analytical calculation of the parameters without iterative adjustments can occur, e.g., by calculating an average spacing between adjacent objects of the segmentation mask and using this average as a standard spacing of the shapes of the pattern. The slope of rows can also be calculated analytically, e.g., by calculating a centre point for each object in the same row of the segmentation mask and then calculating a regression line through those centre points; the slope is then the angle between the regression line and a predefined reference line, for example an edge of the image/segmentation mask.

Image Classification for Limiting Pattern, Exploitation of Contextual Data

It is possible to calculate an image classification of the image or a processing image created therewith such as, e.g., the segmentation mask. This can occur in particular with a classification model that was learned by a learning algorithm using training data. Different patterns, which are described by respective parameterized models, can be stored for different image classes. For example, a pattern can be used to describe a cover slip on a slide. This pattern defines a rectangle or square, wherein the orientation and size of the rectangle require adjustment via parameter values. Another pattern can describe objects with an identical shape arranged in a matrix and be used for an image class indicating a microtiter plate or a chamber slide. Depending on a result of the image classification, an associated stored pattern is selected and used for the adjustment to the segmentation mask. Microtiter plates and chamber slides can also be classified as different image classes so that either a pattern with round shapes or a pattern with rectangular shapes can be selected.

Alternatively or additionally, the image or a processing image calculated therewith, e.g. the segmentation mask, can be assessed in order to detect a sample carrier type. Different sample carrier types can be, e.g., microtiter plates, Petri dishes with a compartmentalization, chamber slides or slides with cover slips. Optionally, the sample carrier type can also distinguish between different sample carrier models of the same category, i.e., e.g., between different makes/model numbers of a number of possible microtiter plates which differ with respect to the number, size and/or spacing of the sample receptacles. Contextual data is stored for different sample carrier types, wherein the contextual data that pertains to the detected sample carrier type is used to adjust the pattern. The contextual data can indicate values of the parameters, e.g., of a parameter that distinguishes between circular, square or rectangular sample receptacles. The contextual data can also relate to parameter starting values and/or parameter limit values (parameter boundary values) for an iterative adjustment of the parameters.

Generating the Updated Segmentation Mask with the Adjusted Pattern

The adjusted pattern can be used directly as the updated segmentation mask.

A segmentation mask determined from an image usually specifies a pixel-by-pixel classification so that an image resolution of the segmentation mask is limited according to the pixels it contains. In contrast, the adjusted pattern used as the updated segmentation mask can take the form of vector graphics. Vector graphics are described by geometric shapes not necessarily subject to a limited image resolution.

The adjusted pattern does not necessarily have to be used as a new segmentation mask. Instead, it can also be used to modify the previous segmentation mask calculated from the image. For example, by comparing the adjusted pattern with the segmentation mask, problem areas in the segmentation mask can be identified and corrected using the adjusted pattern. In particular, the problem areas of the previous segmentation mask can be replaced by corresponding areas of the adjusted pattern, the remaining image areas of the previous segmentation mask remaining unmodified. The thus corrected segmentation mask can then be used as the updated segmentation mask.

Exploiting Calibration Data

Calibration data indicating a relationship between positions in the (overview) image and spatial coordinates in relation to the measuring device/microscope can be available or can be determined. It is in particular possible to take into account the angle at which a sample stage or a sample carrier is viewed by means of the calibration data. The calibration data thus enables a mapping of a captured image onto another plane. It is thus possible to calculate a homography in which an (overview) image in which a sample carrier is viewed from an oblique direction is converted into a plan-view image. The plan-view image corresponds to a view of the sample carrier from a direction perpendicular to its top side. In some variant embodiments, a plan-view image is first calculated from the image using calibration data and the segmentation mask is subsequently calculated from the plan-view image. This often enables an easier and better calculation of a segmentation. For example, if plan-view images are used consistently, training data used for the segmentation model can be reduced in scope. In the case of a microtiter plate with circular wells, the shape of the wells in a segmentation mask of a plan-view image should be exactly circular, whereby the use of additional parameters for describing an oblique view becomes unnecessary.

Alternatively, the segmentation mask for the overview image can also be determined without first calculating a plan-view image with calibration data. In this case, the segmentation mask generally corresponds to an oblique view, which has to be taken into account for the pattern to be adapted. For example, the model has to represent ovals in order to replicate circular wells in an oblique view. Additional parameters can be used to this end, for example two parameters for defining ovals instead of one parameter for a circle. The perspective of an even spacing between sample receptacles changes in an oblique view so that a distance in the horizontal direction x can be described by two parameters a and b, for example in the form a+bx, and a distance in the vertical direction y accordingly by two further parameters. Instead of increasing the number of parameters in this manner, it is also possible to use the calibration data in the calculation of the pattern. The pattern described by the parameterized model can thus be converted using the calibration data relating to viewing characteristics of the (overview) image (e.g. viewing angle and position relative to the camera) before the pattern is adjusted to the segmentation mask. The parameters of the model can thus describe, e.g., circles of a uniform size and with a uniform spacing, as described in the foregoing. By means of the calibration data, this pattern is mapped homographically onto another plane corresponding to the segmentation mask. The pattern is thus treated as a plan view, which is transposed homographically into the appropriate oblique view.

General Features

A microscopy system is understood to be an apparatus that comprises at least one computing device and a microscope. In principle, a microscope can be understood to be any measurement device with magnification capabilities, in particular a light microscope, an X-ray microscope, an electron microscope, a macroscope or an image-capturing device with magnification capabilities of some other design.

The computing device can be designed to be an integral part of the microscope, arranged separately in the vicinity of the microscope or be arranged at a remote location at any distance from the microscope. The computing device can also be designed to be decentralized and communicate with the microscope via a data link. It can generally be formed by any combination of electronics and software and comprise in particular a computer, a server, a cloud-based computing system or one or more microprocessors or graphics processors. The computing device can also be a control unit for controlling the microscope camera, image capture, the sample stage drive and/or other microscope components, or can alternatively be provided in addition to such a control unit. The computing device or a part of the same can in particular be provided at a site of a microscope manufacturer while the microscope is used at some other site.

The image can be any image captured by a camera or a section of the same. Alternatively, the image can be calculated from a captured image or from a plurality of images from the same camera or different cameras. The image can in particular be an overview image showing a sample environment with, e.g., a sample carrier. The overview image can be acquired with an overview camera, which can be provided in addition to a sample camera capable of capturing images of a sample area with a higher magnification. Alternatively, one and the same camera can be used, wherein different objectives or optical systems are used for the capture of an overview image and a more magnified sample image. A raw image from a camera can be used directly as the overview image or, alternatively, the overview image can be calculated from one or more raw images. For example, a plurality of raw images staggered laterally can be stitched together to form the overview image. As described above, it is possible to calculate a homography from one or more raw images before the (overview) image is obtained from the same. A plurality of raw images can also be superimposed to form an overview image.

A segmentation mask can be understood in the present disclosure as an image in which it is respectively specified for different image areas to which object they belong. The segmentation mask thus labels boundaries of displayed objects. If the segmentation mask is calculated by a machine learning model, i.e. by a segmentation model, the segmentation model defines what kind of objects are labelled in the segmentation mask. For example, it is possible to label sample receptacles of a sample carrier as objects. A labelling of the object or object type to which an image area belongs can occur by means of pixel values. The segmentation mask can thus be a binary mask, wherein two different pixel values are used to label whether a pixel belongs to one or the other of two possible objects (e.g. sample receptacle or no sample receptacle). A segmentation mask can also use more than two different pixel values in order to distinguish between a plurality of objects. The calculation of such a segmentation mask can occur, for example, by means of a plurality of machine learning models trained to segment different objects, which respectively calculate a binary mask and subsequently superimpose the plurality of binary masks in order to form a segmentation mask with more than two pixel values. Segmentation masks often consist of pixels, i.e. a 2D matrix of image elements, although vector graphics can alternatively also be used as segmentation masks. The segmentation model can also be designed for semantic segmentation or instance segmentation with in principle any network architecture.

The segmentation model is a model trained for image segmentation and can be or comprise, for example, a CNN (convolutional neural network) or an FCN (fully convolutional network). A learning algorithm adjusts model parameters to be determined, such as the entries of convolution matrices of a CNN, by means of the training data. The learning algorithm can, e.g., minimize a loss function by iteratively adjusting the model parameters via gradient descent and backpropagation. Further embodiments of the invention result when the described trained model for image segmentation is replaced by a classic image processing program which calculates the segmentation mask from an image without using a learned model. A segmentation mask can also exhibit imprecisions or errors in this scenario, which can be corrected by the described adjustment of a pattern.

A computer program according to the invention comprises commands that cause the execution of one of the described method variants when said method variants are executed by a computer. The computer program can in particular comprise commands by means of which it is possible to implement the processes described in relation to the computing device.

The method according to the invention can receive an image captured by a microscope or, generally speaking, by any other measuring device. In principle, the measuring device can be based on any measuring principle and additionally comprise a camera. The step of capturing the image can optionally form part of the method. Alternatively, the method draws on images already available or image data from a memory.

The characteristics of the invention that have been described as additional apparatus features also yield, when implemented as intended, variants of the method according to the invention. Conversely, the microscopy system can also be configured to carry out the described method variants. In particular, the computing device can be configured to carry out the described method variants and output commands for the execution of described method steps. The computing device can also comprise the described computer program.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components.

DETAILED DESCRIPTION OF EMBODIMENTS

Different example embodiments are described in the following with reference to the figures.

FIG. 2

Figure 2:
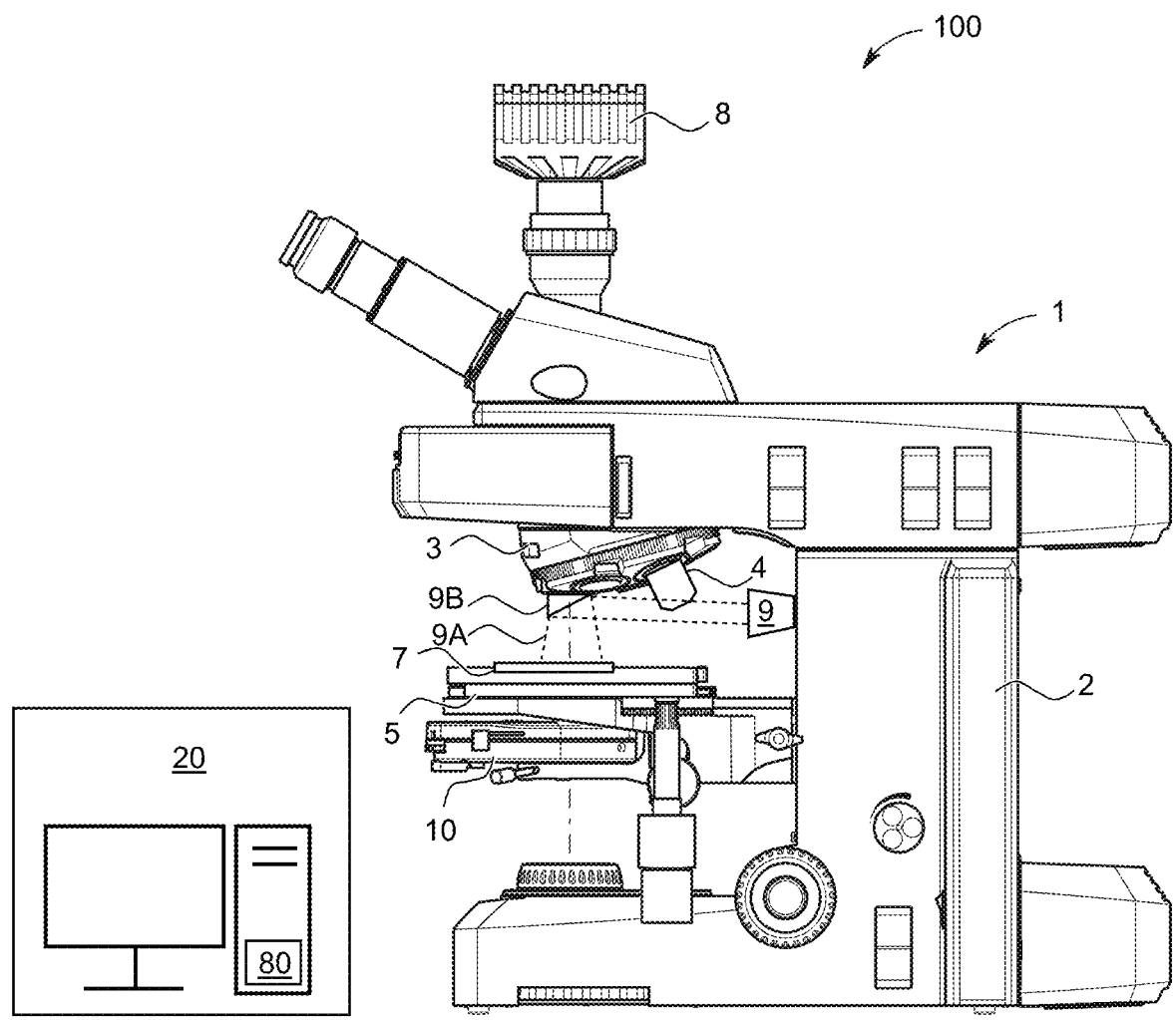
FIG. 2 is a schematic illustration of an example embodiment of a microscopy system of the invention.

FIG. 2 shows an example embodiment of a microscopy system 100 according to the invention. The microscopy system 100 comprises a computing device 20 and a microscope 1, which is a light microscope in the illustrated example, but which in principle can be any type of microscope. The microscope 1 comprises a stand 2 via which further microscope components are supported. The latter can in particular include: an objective changer/revolver 3, on which an objective 4 is mounted in the illustrated example; a sample stage 5, on which a sample carrier 7 is arranged, and a microscope camera 8. If the objective 4 has been rotated so as to be located in the microscope light path, the microscope camera 8 receives detection light from one or more samples supported by the sample carrier 7 in order to capture a sample image. A sample can be any object, fluid or structure. The sample carrier 7 and accommodated samples can be illuminated by light from an illumination device via a condenser 10. The microscope 1 also comprises an overview camera 9 for capturing an overview image of a sample environment. The overview image can show in particular the sample carrier 7 or a part of the same. A field of view 9A of the overview camera 9 is larger than a field of view when a sample image is captured. In the illustrated example, the overview camera 9 views the sample carrier 7 via a mirror 9B. The mirror 9B is arranged on the objective revolver 3 and can be selected instead of the objective 4. In variants of this embodiment, the mirror or some other deflection element can also be arranged at a different site. Alternatively, the overview camera 9 can also be arranged so as to view the sample carrier 7 directly without a mirror 9B. For example, the overview camera 9 can be arranged on the objective revolver 3. In principle, it is also possible for the microscope camera 8 to function as an overview camera when a different objective, in particular a macro-objective, is selected via the objective revolver 3 for the capture of an overview image. An optional light source can be added for illuminating the area around the sample carrier 7 in the angle of view of the overview camera 9.

The computing device 20 comprises a computer program 80 for processing the overview image. This image processing and subsequent calculation steps are described in greater detail in the following with reference to the further figures.

Figure 3:
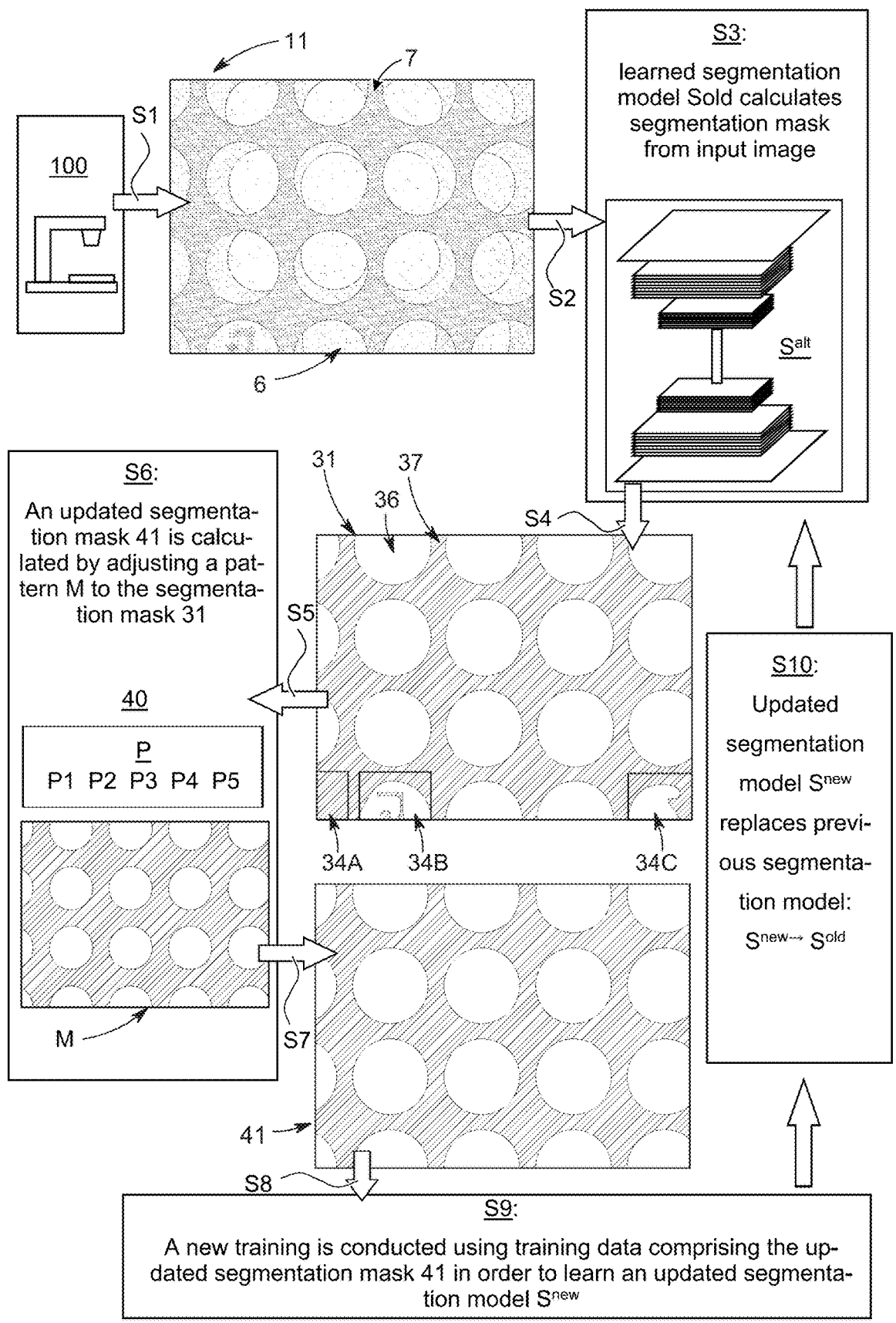
FIG. 3 is a schematic illustration of an example embodiment of a method of the invention.
Figure 4:
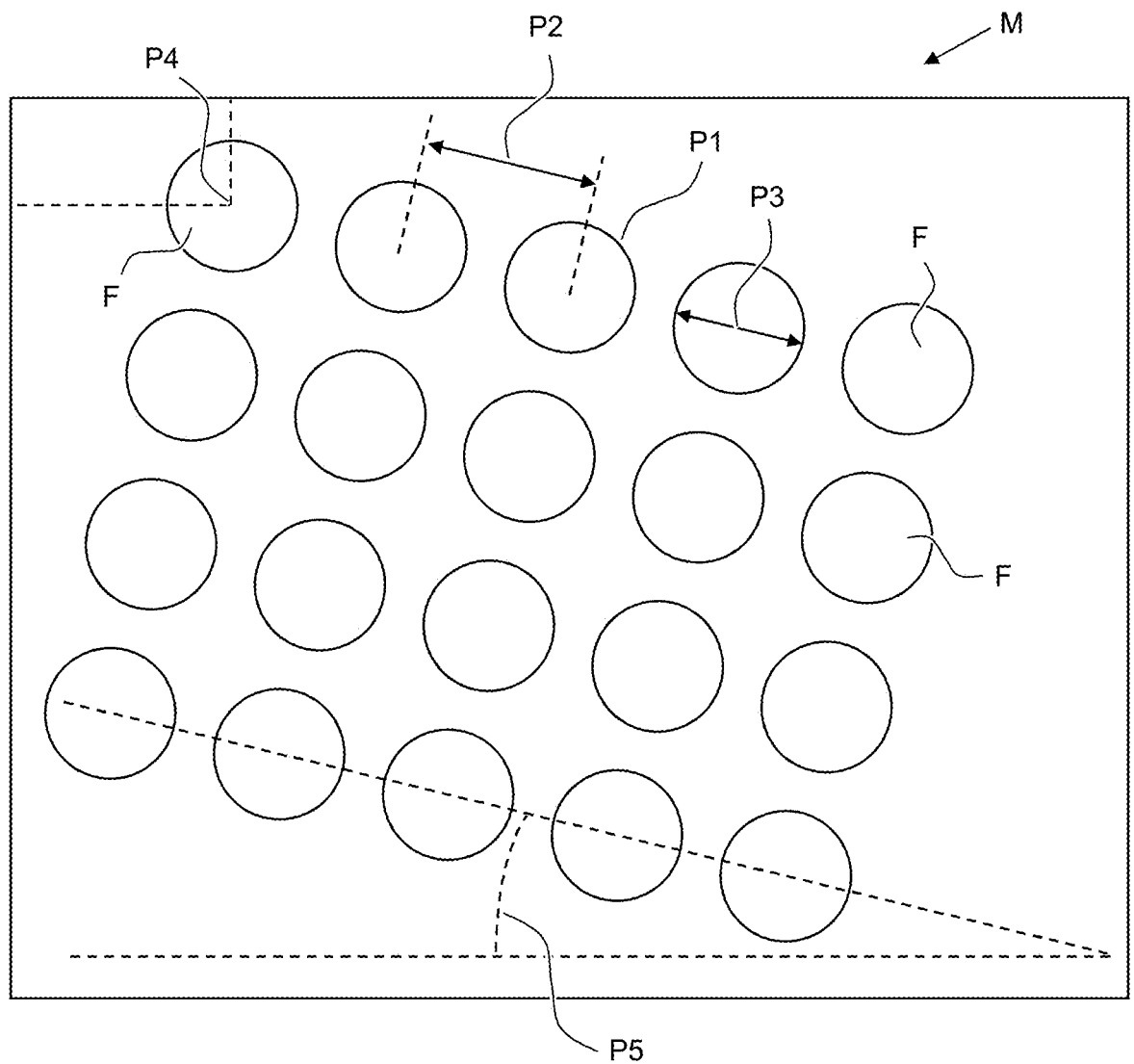
FIG. 4 shows schematically a regular pattern used to improve a segmentation mask in example embodiments of the invention.

FIGS. 3 and 4

FIG. 3 illustrates a process of an example embodiment of a method according to the invention that can be executed by the microscopy system of FIG. 2, in particular by the computing device 20 or the computer program 80.

In step S1, an image 11 is received from the microscopy system 100, which is called the overview image 11 in the following. The overview image 11 can correspond to captured raw data or can be first formed via a processing of the raw data and shows at least a part of a sample carrier 7 with a plurality of sample receptacles 6.

Various objects (e.g. the sample receptacles) require identification and localization in overview images in order to control further processes in an automated or partially automated manner on this basis. In particular the sample stage, a focus drive or other microscope components are to be controlled in this connection. As part of the assessment of an overview image, a segmentation mask of the overview image is created using a trained segmentation model. Further learned models can subsequently be used for analysis. It can occur that an overview image shows novel structures or is captured under novel conditions for which no training images were provided in the training of the segmentation model. For instance, the overview image can show a novel sample carrier type, edges of sample receptacles can be difficult to detect due to novel sample types in the sample receptacles, or the appearance of the sample receptacle can be altered due to different lighting conditions. It can be expedient to supplement the training data for these illustrative scenarios. This conventionally requires a large amount of time and effort invested in a manual annotation of training data by a user, e.g., in drawing segmentation masks manually or correcting roughly calculated segmentation masks. This investment of time and effort becomes unnecessary through the measures described in the following. It is simultaneously possible to achieve a particularly high quality of training data.

Figure 1:
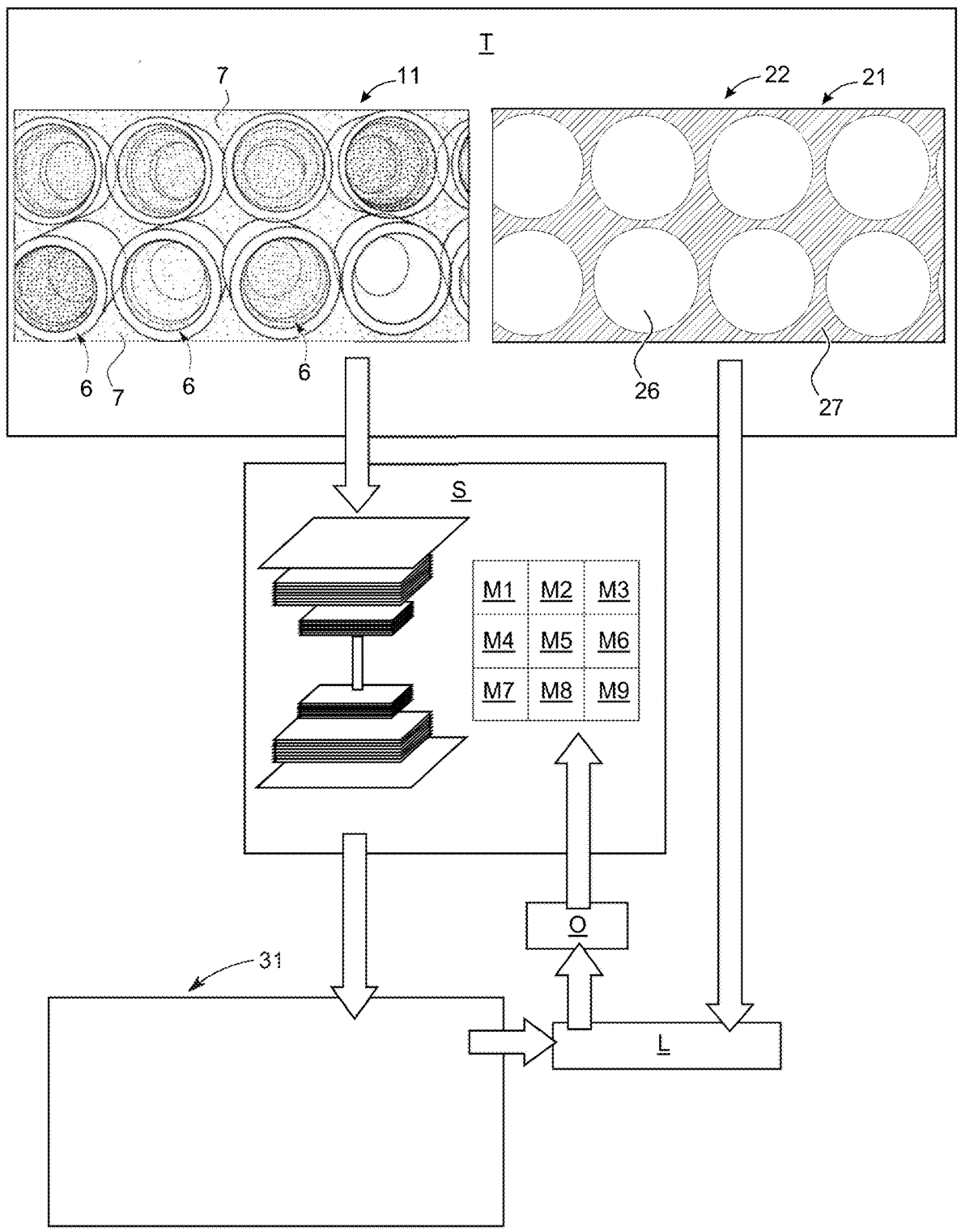
FIG. 1 is a schematic illustration of a training of a machine learning model.

First, in step S2, the overview image 11 is entered into a previous learned segmentation model $S^{old}$. The segmentation model $S^{old}$ can have been trained, for example, as described with reference to FIG. 1. It calculates a segmentation mask 31 from the overview image 11 in step S3, which is output in step S4. The segmentation mask 31 can be, e.g., a binary mask and discriminate between image areas 36 of sample receptacles and other image areas/background 37. As shown in the outlined problem areas 34A-34C, errors can occur in the segmentation. A sample receptacle 6 was not detected in the problem area 34A while shapes of sample receptacles 6 were detected erroneously in the problem areas 34B-34C. These errors need to be corrected.

To this end, in step S5, the segmentation mask 31 is entered into a program 40 for adjusting a pattern M. The program 40 can be part of the computer program 80. The pattern M is described by a parameterized model P comprising a plurality of parameters P1-P5 the values of which are defined by the program 40 so that the pattern M corresponds as closely as possible with the segmentation mask 31, step S6. For example, the parameters P1-P5 can define the size and spacing of circular shapes arranged in the form of a grid, which is described in greater detail with reference to the next figure. Once the values of the parameters P1-P5 have been determined, the pattern M formed with these values of the parameters P1-P5 can be output as the updated or new segmentation mask 41, step S7.

The description of the processes of FIG. 3 is interrupted here in order to describe the adjustment of the pattern M with reference to the next figure.

FIG. 4 shows a pattern M, which is the representation of a parameterized model and which is to be adjusted to the segmentation mask 31 of FIG. 3. The parameterized model can specify, e.g., that certain shapes F are arranged in a regular matrix in the form of a grid, for example in rows and columns. The shape F can be predefined by the parameterized model, for example as a circle as illustrated, although a square, rectangle or oval shape is in principle also possible. Alternatively, the shape F can also be included in the parameterized model in the form of a parameter P1 so that the model is able to use a shape among different predefined shapes as a function of the parameter P1 chosen. A further parameter P2 of the model determines a spacing between the centre points of adjacent shapes F. A parameter P3 indicates a size or diameter of the shapes F. A parameter P4 indicates a position of the pattern M, for example through image coordinates of a centre point of the top left shape F. A parameter P5 indicates a slope of a row of the shapes F.

Optionally, the parameterized model can also comprise further parameters or some of the described parameters P1-P5 can be replaced by other parameters in order to describe the pattern M. Possible further parameters can indicate in particular a number of shapes per row and/or per column. The design of the pattern M illustrated and described in the foregoing is not intended to be understood as exhaustive so that it is possible to add other shapes depending on the complexity of the model. For example, an additional rectangle can extend around all illustrated shapes F and also be aligned in terms of its slope according to parameter P5. Such a rectangle or square can represent an outer edge of a sample carrier. Such further shapes can be provided in particular when a segmentation mask discriminates between more than two different categories, for example the three categories: sample receptacle/area, sample carrier and background.

Contextual data can also be derived from an overview image or a segmentation mask, which is taken into account in the choice of the parametric model or with regard to the parameters P1-P5. For example, a number of sample receptacles per row can be derived from the segmentation mask. This number is used for the shapes F per row. Optionally, a sample carrier type can be detected from the overview image or the segmentation mask, wherein a number of sample receptacles per row and column as well as a shape of the sample receptacles is stored for different sample carrier types.

Values of the parameters P1-P5 are adjusted so that a correspondence of the pattern M with the segmentation mask 31 of FIG. 3 is maximized. Correspondence can be defined, e.g., as the proportion of the shapes F corresponding with the image areas 36 of the segmentation mask 31 in terms of surface area. This adjustment of the parameters P1-P5 can be calculated iteratively or analytically. The ready adjusted pattern M can then be used as the new/updated segmentation mask, which is constituted by exact geometric shapes without defective areas. With reference to FIG. 3, in particular problem areas 34A-34C of the segmentation mask 31 are redressed by the regularity of the pattern M and the provision of corresponding corrected content for said problem areas 34A-34C. For example, a sample receptacle 6 that was truncated in the original overview image 11 was not detected in the problem area 34A. The regularity of the pattern M, however, adds a shape F for the sample receptacle 6 at the location in the image corresponding to the problem area 34A.

With reference to FIG. 3, the updated segmentation mask 41 is now incorporated in training data of a machine learning model, step S8. In this example, the machine learning model is the segmentation model that calculated the segmentation mask 31. The training data used for the training of the segmentation model $S^{old}$ is thus supplemented or replaced by the updated segmentation mask 41. In the training, the overview image 11 is used as the input image and the updated segmentation mask 41 is used as the associated target image, step S9. The training can be carried out as described for FIG. 1 with the difference that the training data has been modified as stated. An updated segmentation model $S^{new}$ is learned by means of this training.

In step S10, the updated segmentation model $S^{new}$ replaces the previous segmentation model $S^{old}$. The training data has been augmented or improved by means of the described measures, which should render the updated segmentation model $S^{new}$ generally superior to the previous segmentation model $S^{old}$. An intervention on the part of a user was not absolutely necessary in order to generate the target data of the training, i.e. the updated segmentation mask 41.

Optionally, after step S10, the described steps as of step S3 to step S10 can be repeated once or a number of times as a cycle. In this scenario, in the repetition of step S3, the updated segmentation model $S^{new}$ is used instead of the previous segmentation model $S^{old}$. The new segmentation mask calculated in the process should be more precise than the segmentation mask 31 described above and illustrated in FIG. 3, although minor imprecisions can still occur. The latter are in turn remedied or reduced by adjustment of a pattern M so that a freshly updated segmentation mask is calculated, which should be even more precise than the updated segmentation mask 41 described above and illustrated in FIG. 3. In the repetition of step S9, the training data is modified accordingly and a new training is carried out.

An application of the thus trained segmentation model is described in the following with reference to FIG. 5.

FIG. 5

Figure 5:
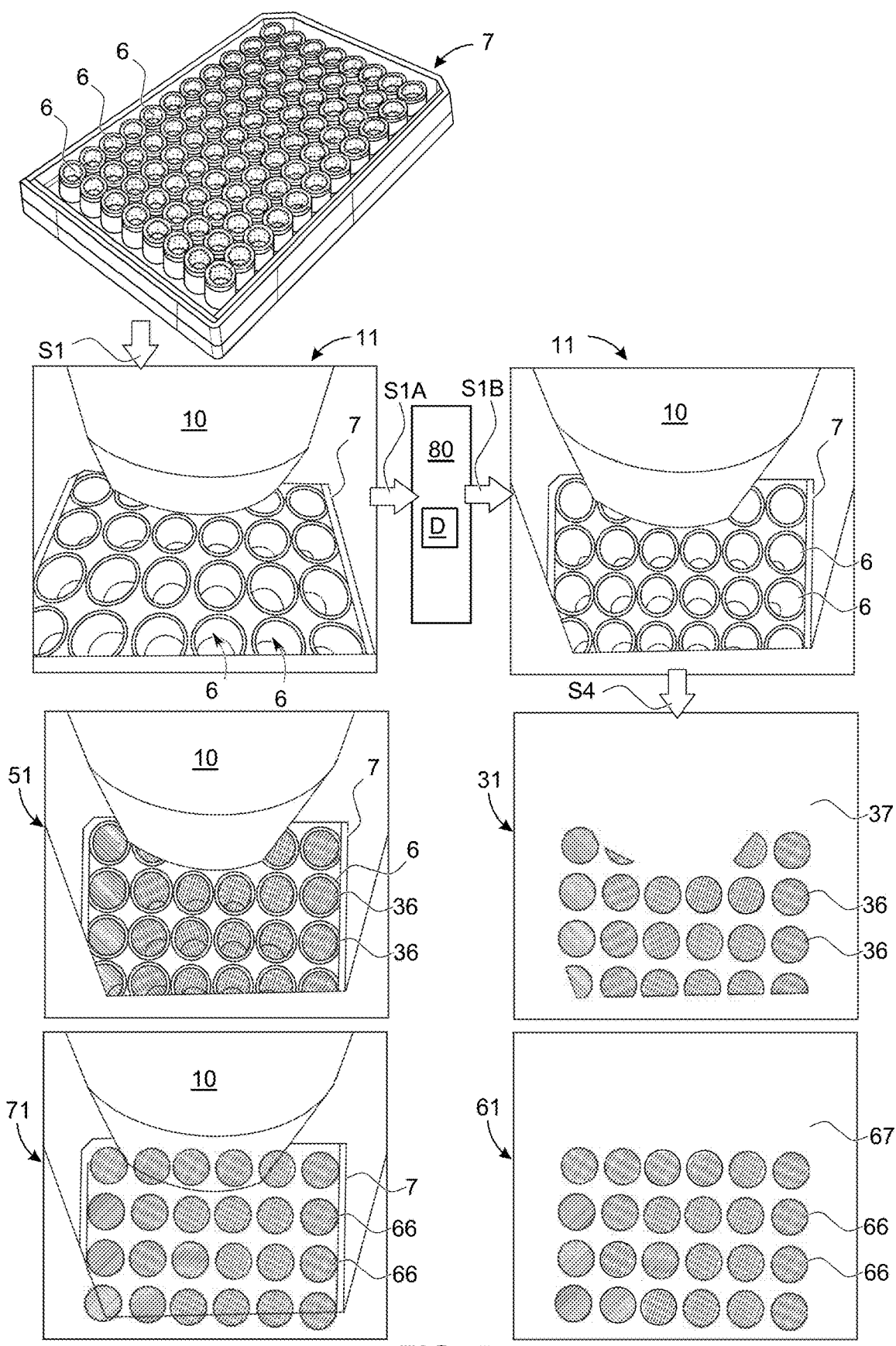
FIG. 5 is a schematic illustration of processes of an example embodiment of the invention.

FIG. 5 shows schematically at the top left a sample carrier 7 with a plurality of sample receptacles 6. In step S1, an overview image 11 is captured. The overview image 11 in this case shows the sample carrier 7 and a plurality of its sample receptacles 6 in an oblique view from above. A condenser 10 of the microscope is also discernible above the sample carrier 7 according to an inverted microscopy arrangement. Due to the oblique view, the perspective of the circular sample receptacles 6 is distorted so that they appear oval and have different diameters in the overview image 11 as a function of the arrangement of the overview camera.

The overview image 11 is input in step S1A into the computer program 80, which contains calibration data D. The calibration data D describes a relationship between positions in the overview image 11 and a reference point on the microscope. For example, the calibration data D can describe an orientation (viewing direction and position) of the overview camera relative to the sample stage or relative to the sample carrier. It is thus possible via the calibration data D to calculate a homographic mapping by means of which the overview image 11 is projected into another plane. In step S1B, the computer program calculates a plan view of the overview image 11 using the calibration data D. The plan view corresponds to a perpendicular view of a surface of the sample carrier 7. As a result, circular sample receptacles 6 are not represented as ovals in the overview image 11 provided as a plan view, but appear more precisely as circles and have a uniform diameter. This makes it easier to perform, e.g., a segmentation while less training data can be required to train a segmentation model.

In step S4, a segmentation is calculated by the previous segmentation model $S^{old}$. In this example, all sample receptacles visible in the overview image 11 have been segmented correctly, as illustrated in the segmentation mask 31. The superimposition 51 shows the overview image 11 provided as a plan view superimposed with the segmentation mask 31. Image areas 36 of sample receptacles extending right up to the edge of the overview image or partially concealed by the condenser 10 are truncated. Sample receptacles entirely concealed by the condenser 10 in the overview image 11 are missing in the segmentation mask 31.

If the overview image 11 provided as a plan view is instead segmented by the updated segmentation model $S^{new}$, a segmentation mask 61 can be calculated, which again delimits image areas 66 of sample receptacles from a background 67. The updated segmentation model $S^{new}$ was learned using training data in which circular shapes with a regular spacing are predefined as target data by means of the described adjustment of a regular pattern. The updated segmentation model $S^{new}$ can thus generate circular shapes in the segmentation mask 61 even if the underlying input image/overview image 11 shows partially truncated circular sample receptacles. As the target data of the training comprises a regular arrangement of circular shapes in rows and columns, it is even possible for the segmentation mask 61 to contain image areas 66 of sample receptacles in spite of the fact that, for example due to concealment by the condenser 10, no sample receptacles 6 are visible in the corresponding areas in the overview image 11. A schematically illustrated superimposition 71 shows segmented image areas 66 of sample receptacles that extend beyond edges of the original overview image 11 as well as image areas 66 of sample receptacles that have been added in image areas where the sample carrier 7 was concealed in the original overview image 11. If a navigation map is formed using the segmentation mask 61 or superimposition 71, sample receptacles 6 that were not visible or not entirely visible in the underlying overview image 11 can nevertheless be the object of an automatic sample stage adjustment.

The described example embodiments are purely illustrative and variants of the same are possible within the scope of the attached claims. Whether or not the updated segmentation model $S^{new}$ is able to add image areas 66 of concealed sample receptacles as illustrated in the segmentation mask 61 depends on the training data. In some variants of the invention, the updated segmentation model $S^{new}$ does not perform such an addition, although the described improvement in precision resulting from the use of the updated segmentation mask as a target image in the training is still achieved. The pattern M shown in FIG. 4 is suitable for describing a microtiter plate with circular wells or more generally for describing an arrangement of circular objects in the form of a grid. In variations of this embodiment, a pattern can also be formed by other shapes, for example by squares for describing a chamber slide with square sample chambers. In further variants, the pattern can also describe one or more geometric objects without periodicity, for example a square, which can describe a segmentation of a cover glass on a slide. The segmented objects thus do not have to represent sample receptacles, but can in principle be any objects with a regular shape and/or arrangement so that a precise adjustment of the pattern is possible.

LIST OF REFERENCE SIGNS

1 Microscope
2 Stand
3 Objective revolver
4 Microscope objective
5 Sample stage
6 Sample receptacle
7 Sample carrier
8 Microscope camera
9 Overview camera
9A Field of view of the overview camera
9B Mirror
10 Condenser
11 Image, especially overview image
20 Computing device
21 Segmentation mask
22 Target image of a training of the segmentation model
26 Image areas of sample receptacles
27 Background/image areas that do not depict sample receptacles
31 Segmentation mask, output image of the segmentation model
36 Image areas of sample receptacles
37 Background/image areas that do not depict sample receptacles
34A-34C Problem areas of the segmentation mask 31
40 Program for adjusting the pattern M
41 Updated segmentation mask
51 Superimposition of segmentation mask and overview image 11
61 Segmentation mask
66 Image areas of sample receptacles
67 Background/image areas that do not depict sample receptacles
71 Superimposition of segmentation mask and overview image 11
80 Computer program
100 Microscopy system
D Calibration data
F Shapes of the pattern M
L Loss function
M Pattern
M1-M9 Model parameters
O Optimization function
P Parameterized model
P1-P5 Parameters of the parameterized model
$S^{old}$ Segmentation model
$S^{new}$ Updated segmentation model, machine learning model
S' Segmentation model
S1-S10, S1A, S1B Steps of method variants of the invention
T Training data

We claim:
1. A microscopy system for generating training data for a machine learning model, comprising
a microscope configured to capture an image; and
a computing device configured to
generate a segmentation mask based on the image;
adjust a pattern described by a parameterized model to the segmentation mask;

generate an updated segmentation mask using the adjusted pattern; and incorporate the updated segmentation mask or an image derived from the same in the training data.

2. A method for generating training data for a machine learning model, comprising:

receiving at least one image and an associated segmentation mask;

adjusting a pattern described by a parameterized model to the segmentation mask;

generating an updated segmentation mask using the adjusted pattern; and incorporating the updated segmentation mask or an image derived from the same updated segmentation mask in the training data.

3. The method according to claim 2, which further comprises the following process:

conducting a training of the machine learning model in which the at least one image is an input image of the training data and the updated segmentation mask or the image derived from the same is used as a predefined target image of the training data.

4. The method according to claim 3, wherein the segmentation mask is calculated based on the image by means of a segmentation model learned using a first set of training data; and wherein the machine learning model trained with the updated segmentation mask is an updated segmentation model whose training data comprises at least part of the first set of training data and the updated segmentation mask.

5. The method according to claim 4, wherein the updated segmentation model replaces the segmentation model, the processes by means of which the segmentation model generates an updated segmentation mask are then repeated and a training is conducted with the updated segmentation mask, whereby a new, freshly updated segmentation model is learned.

6. The method according to claim 2, wherein the pattern is regular with repeating shapes.

7. The method according to claim 6, wherein the regular pattern comprises an arrangement of similar shapes in the form of a grid.

8. The method according to claim 6, wherein the regular pattern describes sample receptacles of a sample carrier.

9. The method according to claim 2, wherein parameters of the parameterized model which define the pattern are calculated so that the pattern has a highest possible degree of correspondence with the segmentation mask.

10. The method according to claim 9, wherein the calculation of the parameters occurs by means of an iterative adjustment in which the degree of correspondence between the pattern and the segmentation mask is maximized.

11. The method according to claim 2, wherein parameters of the parameterized model indicate one or more of the following characteristics:
a uniform size of shapes of the pattern;
a uniform spacing between shapes of the pattern;
a slope of rows or columns of the shapes of the pattern;
a class type of the shapes of the pattern;
a position of the pattern relative to the segmentation mask.

12. The method according to claim 2, wherein an image classification of the image or a processing image calculated therewith is calculated;

wherein different patterns described by respective parameterized models are stored for different image classes;

wherein, depending on a result of the image classification, an associated stored pattern is selected and used for the adjustment to the segmentation mask.

13. The method according to claim 2, wherein the image or a processing image calculated therewith is evaluated in order to determine a sample carrier type;

wherein contextual data is stored for different sample carrier types;

wherein the contextual data pertaining to the detected sample carrier type is used to adjust the pattern.

14. The method according to claim 13, wherein the contextual data relates to at least one of parameter starting values and parameter boundary values for an iterative adjustment of the parameters.

15. The method according to claim 14, wherein the adjusted pattern is used as the updated segmentation mask and is a vector graphic.

16. The method according to claim 2, wherein problem areas in the segmentation mask are identified by comparing the adjusted pattern with the segmentation mask and are corrected using the adjusted pattern, and wherein the thus corrected segmentation mask is used as the updated segmentation mask.

17. The method according to claim 2, wherein a plan-view image is first calculated from the image using calibration data and wherein the segmentation mask is calculated from the plan-view image; or wherein the segmentation mask is calculated from the image without first calculating a plan-view image with calibration data, and wherein the pattern described by the parameterized model is converted to a viewing angle of the image using the calibration data before the adjusting of the pattern to the segmentation mask occurs.

18. A computer program stored on a non-transitory computer readable medium with commands that, when executed by a computer, cause the execution of the method according to claim 2.

19. A microscopy system for generating training data for a machine learning model, comprising a microscope configured to capture an image of an object having a visible pattern; and a computing device configured to:
generate a segmentation mask based on the image;
adjust a pattern described by a parameterized model of the visible pattern to the segmentation mask;
generate an updated segmentation mask using the adjusted pattern; and
incorporate the updated segmentation mask or an image derived from the same in the training data.

20. The microscopy system according to claim 19, wherein the computing device is further configured to:
calculate an image classification of the image or a processing image calculated therewith;
select an associated stored pattern from a plurality of different stored patterns stored for different image classes depending on a result of the image classification, wherein each of the plurality of different stored patterns is described by a respective parameterized model; and use the selected associated stored pattern for the adjustment to the segmentation mask.

\* \* \* \* \*